Aug. 13, 1940. S. OEHNINGER ET AL 2,211,383
METHOD OF AND DEVICE FOR THE COLORED REPRODUCTION OF FILMS
Filed Feb. 4, 1937
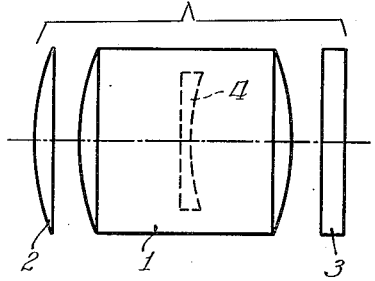
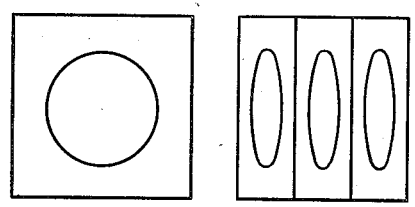
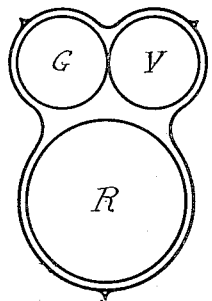
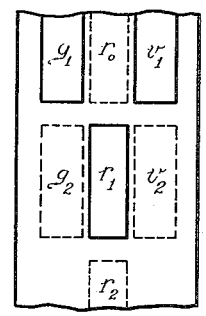
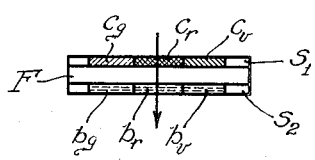
Inventors:
Stephan Oehninger
Willy Mühlau
By: Richardson & Auer
Attys.

Patented Aug. 13, 1940

2,211,383

UNITED STATES PATENT OFFICE 2,211,383

METHOD OF AND DEVICE FOR THE COLORED REPRODUCTION OF FILMS

Stephan Oehninger, Kilchberg, near Zurich, Switzerland, and Willy Mühlau, Berlin-Charlottenburg, Germany, assignors to the firm Lord Investierungs Korporation Aktiengesellschaft (Lord Investment Corporation Limited), Zug, Switzerland Application February 4, 1937, Serial No. 124,062
In Germany February 5, 1936

11 Claims. (Cl. 95—2)

This invention relates to a new process of the so-called "additive" kind for producing moving pictures in colors.

In order to be able to reproduce a field of view as a colored photograph by color photography, in practice three color record negatives are usually made in the first place. These three color record negatives, which are either taken through three differently colored filters, for example, red, green, and blue, or on emulsions which, by selective sensitivation and—in case of green and red—by tinting the gelatine with a blue-absorbing color as, for example, tartrazin, are sensitive practically only to the colors in question, contain the red fraction, the green fraction, and the blue-violet fraction of the individual color fields of the field of view photographed.

There are two possible fundamental processes of reproducing in colors the pictures taken in this way, namely, firstly, the "subtractive" process, and secondly, the "additive" process. In the subtractive process color-graduated positives are taken from the aforesaid color record negatives, and these are toned in the complementary color to that of the filter through which the corresponding negative was taken. These color-graduated positives, so-called "monochromes," are then superimposed in accurate register.

With this process white surfaces appear colorless, i. e., clearly transparent, in the three superimposed "monochromes." They are therefore depicted on the projection screen with the same brightness as in the case of a normal silver halide positive film. Black surfaces appear in each of the differently colored monochromes in the deepest color. The superimposed monochromes, therefore, each extinguish or block out in succession one-third of the visible spectrum from the light passing through at the dark places of the field of view. Dark surfaces consequently appear to be of the same blackness on the projection screen as with a normal black and white film. The subtractive process consequently gives the same range of gradation in projection as a black and white film. Against this advantage of the subtractive process, however, a number of disadvantages must, as is well known, be set off.

As distinguished from the subtractive process, in the additive process normal black and white positives are made from the color record negatives, and these positives are placed beside one another for being projected. Projection is then effected with the aid of three separate light beams, each of which passes through one of the positives and through a saturated color filter, the color of which corresponds to that of the filter used in taking the color record negative from which the positive was made. By properly adjusting the direction of the light beams, pictures of the three positives are brought into register with one another on the screen. This process does indeed give extremely pure and impressive colors, but leads to a great deficiency in light. With this process, also, a white surface appears transparent in all three color selective positives. But since the light of all three rays is passed through saturated color filters, the effect produced by the superposition on the screen of the three colored projected rays is not white, but a grey which has only one-seventh to one-tenth of the brightness of the white obtained with a black and white film, or with the subtractive process. Therefore, since the available range of gradation extends only from this maximum degree of brightness to black, a much more intensive source of light is required for projecting a film by the additive process than with the above described subtractive process in order that the brightness of the projected picture may be the same in both cases.

This disadvantage cannot be obviated by omitting the color filters on projection and replacing the black and white positives by color-graduated positives which are toned with the color of the filter used for the exposure. If this were done, although the transparent white surfaces in all three pictures would appear on the screen as unweakened white, black surfaces would not appear black but, owing to the superimposition of the three saturated colored rays, as a grey having about one-tenth the brightness of unweakened white. The total range of gradation would therefore comprise only the entirely insufficient ratio of 10:1. In actual practice dull pictures with insufficient contrast are obtained by this method.

Similarly, the troublesome lack of light in multicolor projection by the additive process cannot be obviated by using a film with two superimposed layers and copying on the under layer the usual black and white positive and on the upper layer a color-graduated negative of this positive in the color of the corresponding filter. In this case the black surfaces are actually black owing to the effect of the black and white positive. The white surfaces, on the other hand, are transparent only in the black and white positive, while in the superimposed color-toned negative they appear with the saturated colors of the corresponding filters. Therefore, when projected, instead of white only, the above-described grey of the usual additive process is again produced.

The invention relates to a process of producing moving pictures in colors, using the additive process, but including features by which the loss of light which was formerly inherent in this process can be avoided. According to the invention, the individual pictures, which are set up beside one another in the projection apparatus and are superimposed for the first time on the screen, are each composed of two part pictures in accurate register, of which the first is a normal black and white positive of one color record negative, and the second a color-graduated positive, that is to say, a true monochrome of the complementary color record negative, said color-graduated positive being toned in the color corresponding to the selective color of the first (black and white) positive. Therefore, since only positives, in which the image of a white surface appears absolutely transparent, are combined, white is reproduced with the same unreduced brightness as in a black and white film or in a color film made by the subtractive process. Black surfaces appear well covered in all three black and white positives, and therefore appear deep black also on the screen. The full range of gradation from unreduced transparency to complete blackness is therefore available with the new process.

In the colored parts the picture obtains its color from the colored monochromes and its proportion of grey from the black and white positives which are in register with these monochromes. For example, a deep red field appears in the black and white positives of the color exposures taken with the blue and the green filters as fully covered, while it is reproduced as fully transparent in the positive of the exposure taken with the red filter. In the red monochrome, which represents a color-graduated positive of the exposure taken with the green filter, this red field appears as a deep red surface. Therefore, the corresponding part of the picture will be reproduced on the screen onto which it is projected in deep red, because only the red monochrome has any effect since the other monochromes are completely covered at the parts in question by the associated black and white positives.

When the above-described process is employed, surprisingly natural colors are obtained in the half-tones, and these are particularly brilliant if the colored monochromes are strongly over-graduated in the weakly colored color tones. It can be proved mathematically that one should even obtain an absolutely accurate reproduction of color if the monochromes are made with the use of a graduation curve having the shape of a reciprocal exponential function. A very close approximation to a gradation curve of this kind can be obtained by copying, for example, by the known chrome-gelatine process, the monochromes from a positive which is printed from a special master negative, the silver halide emulsion of said master negative having a drooping graduation curve, as well known in the art.

The above described invention will now be explained more in detail with reference to the accompanying drawing, in which—

Fig. 1 is a diagrammatic representation of a lens system;

Figs. 2 and 2A are, respectively, representations of a disk taken through an ordinary objective and through the lens system of Fig. 1;

Fig. 3 is a front view of another lens system which may be used in place of the one shown in Fig. 1;

Fig. 4 shows the arrangement of the exposure fields on the film when a lens system like that shown in Fig. 3 is used;

Fig. 5 is a diagrammatic transverse section through a film provided with two separate layers; and Fig. 6 is a similar section through a film provided with a compound layer.

Referring first to Fig. 5, this figure represents diagrammatically a cross-section through a film F which carries the two layers $S_1$ and $S_2$. On the layer $S_2$ are copied one beside another by the usual rules of the additive process the three black and white pictures $b_g$, $b_r$, and $b_v$, which are normal positives of the color record negatives taken with the green, red, and blue-violet color filters. On the other layer $S_1$, in exact register with the three former pictures are three color-toned monochromes $C_g$, $C_r$ and $C_v$, which are colored in the corresponding colors of the additive process, that is to say, green, red, and blue-violet, respectively. Each one of these monochromes is toned in the selection color of the associated black and white color selection positive, and lies in register with it, but is printed from the complementary color selection-negative. It is well known that red and green are complementary colors. Therefore, the black and white positive, taken from the red color selection negative, is combined and printed in register with the red-toned color positive $(c_r)$ made from the green color selection negative. The red color selection negative may also be considered as a yellow color selection negative, it being well known that the usual red selection filters are penetrable by red and yellow rays. Blue and yellow being complementary colors, the red color selection negative contains a color selection record, which is complementary to the blue color selection negative. The black and white positive $(b_v)$ of the latter, therefore, may be combined and printed in register with the blue-toned color positive $(c_v)$ of the first. Similarly, it is well known that the usual blue-violet selection filters are penetrable not only by blue but also by a purple-red, and therefore the blue color selection negative contains a color selection record which is complementary to the green color selection negative. Therefore, the black and white positive $(b_g)$ of the green color selection negative may be combined and printed in register with the green-toned color positive $(c_g)$ of the blue color selection negative.

In order to simplify the production of films of the kind described herein, two master records may be used. The first of these master records is the primary negative or the usual duplicate of it, which may be used for printing the black and white positives of the individual pictures. The second master record may be used for printing the color-toned monochromes in register upon said black and white positives. In order to obtain the above-described combination of complementary records lying in register upon the film used for projection, the green color selection picture on the said second master record must have the position of the red color selection picture in the first master record. Similarly, the red color selection picture of the second master record must have the position of the blue-violet color selection picture of the first master record and the blue-violet color selection picture of the second master record must have the position of the green color selection picture of the first master record. As will be readily understood, a second master record of this kind may be obtained by printing from the first master record, a second record in which the positions of the individual color records, as compared with those of the first master record, are subjected to a cyclic interchange according to the following diagram:

In this diagram the letters $g$, $r$, $v$, represent the positions of the individual color selection pictures within the first master record (primary negative used for printing the black and white positives), and the arrows give the direction of the interchangement which is performed in producing the second master record. This latter record is then used for printing the color-toned monochrome positives, each of which is arranged in register with that black and white positive which is printed from the complementary color selection negative.

When a film of the kind shown in Fig. 5 is projected, lack of sharpness of course occurs if the two layers $S_1$ and $S_2$ are disposed, as illustrated, on opposite sides of the film F. It is preferable therefore to arrange the layers $S_1$ and $S_2$ in register with each other on the same side of the film and preferably so that they mutually penetrate. If the colored monochromes $c$ are incorporated, by the imbibition process, directly in the gelatine which already contains the finished silver picture $b$, there is obtained a film of the kind shown in Fig. 6. The emulsion K of the film F consists of a layer of gelatine which is colored with varying intensity and encloses the grains K of the silver picture. The intensity of the coloration which varies from point to point in the picture is indicated by the varying hatching in Fig. 6.

For carrying the process of the invention into effect, it is clearly necessary to color differently the fields of the positive belonging to the individual monochromes. It has been found that the production of this coloration is difficult if the monochromes $c$ with their corresponding cover pictures $b$ are reduced in the proportion of 1:2 in the manner hitherto adapted in the additive process. These difficulties associated with the coloration can be entirely obviated if, instead of employing a normal reduction, the pictures are subjected only to a unilateral or so-called anamorphotic distortion, which is such that the pictures can be disposed one beside another. An anamorphotic distortion in the proportion 1:3.2 is sufficient to maintain the unit film area and even ensures sufficient distances between the pictures in order to make color mixtures at the edges of the pictures impossible.

The simplest means for producing anamorphotically distorted pictures is, as is well known, the anamorphotizing apparatus of Abbe which, as shown in Fig. 1, consists of a normal objective 1 which is mounted between two crossed cylinder lenses 2 and 3. If, for dividing the picture, a prism 4 is introduced into such an objective, then a ring, for example, which a normal objective would depict on the film as a circle, as shown in Fig. 2, is depicted as three ellipses disposed side by side, as shown in Fig. 2A.

In practice, anamorphotic optical systems with internal picture division can be made to work only with some difficulty. Moreover, they generally produce part pictures which are weak in light. Therefore, for the exposure of the films in accordance with the invention there is preferably used a system of the kind shown in Fig. 3, which consists of three separate objectives arranged in the form of a triangle each of which produces an anamorphotically distorted picture on the film. A color filter, the color of which, namely, red, green, or blue-violet, as indicated by the letters R, G or V in Fig. 3, is disposed in front of each of these objectives. The objectives G and V are close together, their axial distance apart being two-thirds the width of a normal film picture. The objective R is arranged in the middle below the objectives G and V in such a manner that the distance of its axis from the line joining the axes of the objectives G, V is equal to the height of a normal film picture. Therefore, by means of the three objectives three fields $g_1$, $r_1$ and $v_1$ are illuminated and, as shown in Fig. 4, are distributed on two normal film fields and are disposed in the form of a triangle.

The advantage of the above arrangement is that one can make use of objectives of large aperture at the smallest possible distance apart, and at the same time space is found for an objective of specially large aperture for the exposure to be taken with the red filter R. If one starts from a normal size and shape of film and takes a focal length of 50 mm. as a basis, it becomes possible with the objectives G and V intended for taking the green and blue-violet color exposures at once to obtain a ratio of aperture to focal length of 1:3.2, and with the objective intended for taking the red color exposure a corresponding ratio of 1:2.3, without the distance between the axes exceeding 20 mm., that is to say, without too great parallax occurring at the distances at which the exposures are usually taken.

Although the individual color exposures $g_1$, $v_1$, $r_1$ are distributed over two normal fields of the film, when the triple anamorphotizing apparatus of Fig. 3 is employed, the whole of the film is utilized with the exception of the first and last fields in each series of pictures. Thus if the film is moved on by the height of one field in the usual manner after each exposure, the three color exposures $g_1$, $v_1$, $r_1$ are combined with the three preceding exposures $g_0$, $v_0$, $r_0$ and with the three succeeding exposures $g_2$, $v_2$, $r_2$ in chess-board-like manner, as shown in Fig. 4.

As has been mentioned above, by using the above described anamorphotic method of exposure, the manufacture of positives according to the method of the invention is decidedly simplified. Thus the result is obtained that the pictures to be colored similarly are disposed one below another in longitudinal rows on the positive (see, for example, the longitudinal row $r_0$, $r_1$, $r_2$ in Fig. 4). Therefore, adjacent longitudinal strips of the same film are provided for the differently colored zones, and these may be directly colored in a single operation by colored impression, by an imbibition process, or by first chromating and printing the gelatine and then immersing the masked and demasked film in three color solutions, one color bath following immediately after another, according to known practice.

Summarizing, the process of the invention may be carried out as a whole in the following manner:

In the first place, using an objective of the kind shown in Fig. 3, there is taken on a common film a series of cinematographic color record negatives, each of which is anamorphotically distorted at right angles to the direction of travel of the film to about one-third of its normal width. The similar color exposures are thus disposed in continuous longitudinal strips of the film in the manner shown in Fig. 4. A black and white positive (layer $S_2$ in Fig. 5) is first taken from this negative film by contact printing. The film is then provided with a second layer ($S_1$) which is intended for the reception of the color-graduated monochromes.

In order to facilitate the subsequent coordination of the monochromes to the black and white positives to be made, a master negative is made in which the places in which the color exposures stand are changed in cyclic sequence, as previously explained. From this master negative the differently colored monochromes can then be copied in a single operation by an imbibition process on the prepared layer $S_1$ of the film in exact register with the previously printed black and white pictures.

The finished positive film then contains three anamorphotic series of pictures which are colored in the colors green, red, and blue-violet. Each of these series of pictures carries its color in monochrome and its grey in silver. The positive film is projected by a triple anamorphotizing apparatus of the kind shown in Fig. 3 which superimposes the pertaining pictures on the screen according to the rules of the additive process. Colored pictures of extraordinary brilliancy and purity of color are then obtained.

We claim:

1. The method of producing a film for colored picture projection, which consists in making by photography a set of color selection negatives, printing black and white positives from said negatives on separate areas of a film, resensitizing said film, printing in exact register with each of said positives a second positive from a color selection negative which contains a record of the complementary color range, and toning each of said last mentioned positives in the selection color of the color selection negative from which the associated black and white positive was made.

2. The method of producing multi-color projection images, which consists in making by photography a set of color selection negatives, comprising different views of the same object, printing black and white positives from said negatives on different areas of a film, forming on each black and white positive and in register therewith a monochrome positive which is toned in the selection color of the color selection negative from which the black and white positive was made and which is made from a color selection negative containing the record of the color which is complementary to the color in which the monochrome is toned, and projecting said positives onto the same area of a screen.

3. The method of producing a film for colored picture projection, which consists in making a set of color selection negatives, each on a different area of a common film, making a set of black and white positives from said negatives on separate areas of a second film, making a set of monochrome positives superimposed on the first set in exact register therewith but in displaced relation such that each pair of positives are made from complementary color selection negatives, and toning each monochrome positive in the color of the color selection negative from which the associated black and white positive was made.

4. The method of producing a film for colored picture projection, which consists in making a set of color selection negatives, making a set of black and white positives from said negatives in separate areas of the sensitized layer of a film, superimposing a second sensitized layer on the first layer, making a set of monochrome positives in said second layer in exact register with the positives in the first layer, and coloring the monochrome positives and arranging them in respect to those in the first layer in such a manner that each black and white positive has superimposed on it a monochrome positive of the same color as the selection color of the negative from which such black and white positive was made but made from another color selection negative containing a record of the complementary color range.

5. The method of producing a film for colored picture projection, which consists in making by photography a negative comprising different views of the same object, each taken through a different color filter, making a second negative in which the said views are interchanged in such a manner that each view in the second negative occupies the position of the view made with the complementary color filter in the first negative, making black and white positives of the first negative on a film, and making monochrome positives superimposed thereon by printing from the second negative and toning each view in the color of the filter used in taking the particular view in the first negative from which the associated black and white positive was made.

6. The method of producing a film for colored motion picture projection, which consists in making by photography a record comprising a plurality of sets of color selection negatives, in printing black and white positives from said negatives on a film, in making a master record from said negatives in which the individual color records of each set are interchanged in such a manner that the green, red, and blue color records occupy the positions of the red, blue, and green color records, respectively, in said first record, forming other positives on said black and white positives by means of said second record, and toning each of said second positives in the record color of the negative from which the associated black and white positive was made.

7. The method of producing motion picture film for color projection, comprising anamorphotically producing color selection negatives which are contracted to about one-third of the normal width and constitute distorted images disposed on a film in three adjacent longitudinal rows, the negatives in the three rows constituting three color records, respectively, forming three rows of black and white positives on another film by printing from said negatives, and forming monochrome positives on said black and white positives and in register therewith, each monochrome being toned in the record control of the row in which it appears and being made from the corresponding negative in the row which contains the record of the complementary color.

8. The method of producing motion picture film according to claim 7, which includes disposing the color selection negatives on the film in such a manner that each negative in the second row is displaced longitudinally from the other two negatives of the same set by the distance of one negative, so that each transverse row of negatives includes two negatives of the same set and one negative of an adjacent set.

9. A method of reproducing moving pictures in colors using a film on which, for each picture, there are a plurality of black and white color-selective positives each of which is positioned in a different area of said film and is in register with a color-graduated monochrome, and the said positives are superimposed by projection onto a screen to give an additive multi-color picture without the use of additional color filters, wherein the color-graduated monochrome in register with each positive is toned in the selective color of the pertaining black and white positive but is printed from another color-selective negative containing the record of the complementary color range.

10. A method according to claim 9, wherein the weakly covered half-tones of the color graduated positives are strongly over-graduated with respect to the strongly covered half-tones of said positives, when being printed or copied.

11. The method of producing a film for colored picture projection, which consists in making by photography a negative comprising different views of the same scene, each taken through a different color filter, making a master record from said negative in which the said views are interchanged in such a manner that each view in the master record occupies the position of the view made with the complementary color filter in the negative, making black and white positives from the negative on a film, making by means of the master record monochrome positives, superimposed on said black and white positives and in registry therewith, and toning each view made from the master record in the color of the filter used in taking the particular view in the negative from which the associated black and white positive was made.

STEPHAN OEHNINGER.
WILLY MÜHLAU.